US009541161B2

(12) United States Patent
Kaisaku et al.

(10) Patent No.: US 9,541,161 B2
(45) Date of Patent: Jan. 10, 2017

(54) ENGAGEMENT CHAIN TYPE DEVICE FOR OPERATING FORWARD AND BACKWARD MOVEMENT

(75) Inventors: Junichi Kaisaku, Osaka (JP); Toru Wada, Osaka (JP); Yoshifumi Takeuchi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 285 days.

(21) Appl. No.: 13/978,796

(22) PCT Filed: Dec. 13, 2011

(86) PCT No.: PCT/JP2011/078755
§ 371 (c)(1),
(2), (4) Date: Jul. 9, 2013

(87) PCT Pub. No.: WO2012/096086
PCT Pub. Date: Jul. 19, 2012

(65) Prior Publication Data
US 2013/0283945 A1   Oct. 31, 2013

(30) Foreign Application Priority Data

Jan. 12, 2011  (JP) ................. 2011-004245

(51) Int. Cl.
B66F 3/06       (2006.01)
F16G 13/20      (2006.01)
B66F 13/00      (2006.01)

(52) U.S. Cl.
CPC ............. *F16G 13/20* (2013.01); *B66F 13/005* (2013.01); *Y10T 74/1884* (2015.01)

(58) Field of Classification Search
CPC .................................. B66F 3/06; F16G 13/20
(Continued)

(56) References Cited

U.S. PATENT DOCUMENTS 3,645,146 A     2/1972 Nagin
5,271,182 A *  12/1993 Greisner .................. B66F 3/06
                                                       49/325
(Continued)

FOREIGN PATENT DOCUMENTS

CA       2070284      4/1992
DE   102005052520     5/2007
(Continued)

OTHER PUBLICATIONS

International Search Report prepared by the Japanese Patent Office on Mar. 13, 2012, for International Application No. PCT/JP2011/078755.
(Continued)

*Primary Examiner* — William Kelleher
*Assistant Examiner* — Gregory Prather
(74) *Attorney, Agent, or Firm* — Sheridan Ross P.C.

(57) ABSTRACT

Provided is an interlocking chain-type forward and backward actuating device, the device being configured so that an increase in the number of parts is minimized, an increase in the size of the device is avoided, the amount of scattering of lubricating oil to the outside of the device is reduced, the wear of connection pins is reduced, the breakage of the connection pins is avoided, and the striking noise and vibration of the chains occurring during the reception of the chains are reduced. Chain guide plates are respectively provided on both sides of a pair of interlocking chains in the chain width direction. Chain locus restriction members having chain locus restriction faces in contact with rigid chain portions, which are made rigid by engaging and integrating the pair of interlocking chains with each other, are disposed so as to be adjacent to the rigid chain portions.

6 Claims, 13 Drawing Sheets

(58) Field of Classification Search
USPC .......................................... 74/89.21; 254/358
See application file for complete search history.

(56) References Cited

U.S. PATENT DOCUMENTS

| | | | |
|---|---|---|---|
| 5,355,643 | A | 10/1994 | Bringolf |
| 5,803,418 | A * | 9/1998 | Bringolf ................ E04C 3/005 |
| | | | 248/158 |
| 6,138,820 | A * | 10/2000 | Ewert ................... B65G 17/40 |
| | | | 198/850 |
| 7,921,986 | B2 | 4/2011 | Ando |
| 2005/0242228 | A1 | 11/2005 | Wagner et al. |
| 2006/0219144 | A1 | 10/2006 | Phelan et al. |
| 2009/0166155 | A1 | 7/2009 | Hishioka et al. |
| 2010/0011667 | A1 | 1/2010 | Sorensen |
| 2010/0051424 | A1 * | 3/2010 | Suko ........................ B66F 3/06 |
| | | | 198/850 |
| 2010/0059727 | A1 | 3/2010 | Suko |
| 2010/0140572 | A1 | 6/2010 | Aoki |
| 2013/0276422 | A1 | 10/2013 | Saji |
| 2013/0298705 | A1 | 11/2013 | Saji et al. |
| 2013/0312554 | A1 | 11/2013 | Saji et al. |

FOREIGN PATENT DOCUMENTS

| | | |
|---|---|---|
| DK | 1591693 | 1/2008 |
| EP | 0799788 | 10/1997 |
| EP | 2146033 | 1/2010 |
| JP | S51-131060 | 11/1976 |
| JP | S64-058883 | 3/1989 |
| JP | H03-012646 | 1/1991 |
| JP | 5-3300 | 1/1993 |
| JP | H06-13399 | 4/1994 |
| JP | H09-119495 | 5/1997 |
| JP | H11-278797 | 10/1999 |
| JP | 3384491 | 12/2002 |
| JP | 2007-269414 | 10/2007 |
| JP | 2008256202 | 10/2008 |
| JP | 2009-001398 | 1/2009 |
| JP | 2009-113872 | 5/2009 |
| JP | 2009-242010 | 10/2009 |
| JP | 2009255997 | 11/2009 |
| JP | 2010-047384 | 3/2010 |
| JP | 2010-065721 | 3/2010 |
| JP | 2010138926 | 6/2010 |
| WO | WO9207154 | 4/1992 |

OTHER PUBLICATIONS

International Search Report prepared by the Japanese Patent Office on Jan. 17, 2012, for International Application No. PCT/JP2011/078679.
International Search Report prepared by the Japanese Patent Office on Apr. 17, 2012, for International Application No. PCT/JP2011/080166.
International Search Report prepared by the Japanese Patent Office on Apr. 17, 2012, for International Application No. PCT/JP2011/080160.
International Search Report prepared by the Japanese Patent Office on Jul. 17, 2012, for International Application No. PCT/JP2012/061567.
U.S. Appl. No. 13/978,278, filed Jul. 3, 2013.
U.S. Appl. No. 13/981,045, filed Jul. 22, 2013.
U.S. Appl. No. 13/983,806, filed Aug. 6, 2013.
U.S. Appl. No. 14/112,077, filed Oct. 16, 2013.
U.S. Appl. No. 14/116,620, filed Nov. 8, 2013.

* cited by examiner

ENGAGEMENT CHAIN TYPE DEVICE FOR OPERATING FORWARD AND BACKWARD MOVEMENT

CROSS REFERENCE TO RELATED APPLICATIONS

This application is a national stage application under 35 U.S.C. 371 and claims the benefit of PCT Application No. PCT/JP2011/078755 having an international filing date of 13 Dec. 2011, which designated the United States, and which PCT application claimed the benefit of Japanese Patent Application No. 2011-004245 filed on Jan. 12, 2011, the disclosure of which is incorporated herein by reference.

FIELD OF THE INVENTION

The present invention relates to an interlocking chain type forward and backward actuating device, which moves a driven body forward and backward and is used in manufacturing facilities in various manufacturing fields, a transportation facility in a transportation field, a nursing care facility in a medical and welfare field, a stage facility in an art field, and the like.

BACKGROUND OF THE INVENTION

Conventionally, as an interlocking chain type forward and backward actuating device, an interlocking chain type lift device has been known that moves a driven body such as a heavy load using a pair of interlocking chains (also referred to as zip chains) that are interlocked with each other and are integrally driven (for example, see Patent Document 1).

Further, as an interlocking chain, an interlocking chain has been known that guides a plate coupling pin projected outside of a plate constituting the interlocking chain in a running groove (for example, see Patent Document 2).

PRIOR ART DOCUMENTS

Patent Documents

Patent Document 1: Japanese Laid-Open Patent Publication No. 2009-255997 (refer to Claims and FIG. 1)
Patent Document 2: Japanese Laid-Open Patent Publication No. 2010-138926 (refer to paragraph [0029] and FIG. 2)

SUMMARY OF THE INVENTION

However, with the above-described conventional interlocking chain type lift device, if an interlocking chain, in which a plurality of chain units are coupled in a chain width direction, is used to increase a transportation capacity of a driven body, a plurality of guide plates that guides each chain unit is required. Therefore, it is a problem that the number of components constituting the device increases.

With the interlocking chain type lift device using the above-described conventional interlocking chain, the locus of the plate coupling pin becomes complicated in front and rear of a chain interlocking portion, where a pair of interlocking chains is interlocked. Accordingly, this makes it difficult to avoid an increase in work when forming a chain guide, in which the chain guide is formed in a complicated guide shape according to the locus of the plate coupling pin.

Additionally, with the interlocking chain type lift device using the above-described conventional interlocking chain, lubricating oil of the chain scatters from the plate coupling pin exposed outside of the plate to the outside of the interlocking chain. There are measures where a cover for preventing the lubricating oil from scattering is provided such that the lubricating oil may not scatter around the interlocking chain. However, even if the cover for preventing the lubricating oil from scattering reduces contamination around the chain, this increases the number of components and the size of the device. Further, the structure of the device renders it difficult to reduce the amount of scatter of the lubricating oil the outside of the device.

Further, with the interlocking chain type lift device using the above-described interlocking chain, in the case where the interlocking chain is driven by engaging a drive sprocket to a rigid chain part where a pair of interlocking chains is interlocked, abrasion force between the plate coupling pin and the entire running groove increases due to an increase in a reaction against a pressing force that the plate coupling pin is pressed to the running groove. This raises a problem where reducing the abrasion of the plate coupling pin is difficult.

Further, with the interlocking chain type lift device using the above-described interlocking chain, when a pair of interlocking chains that is interlocked to maintain a rigid state is extended from a chain guide to the outside of the device and the rigid chain part is housed from an inlet of the chain guide again, a wobbling occurs at the rigid chain part according to drive of the chain. There is a problem when the plate coupling pin intermittently collides with an edge of the inlet of the chain guide, generating a chain collision noise and a vibration and damaging the plate coupling pin.

Accordingly, a technical problem that the present invention aims to solve, namely, an object of the present invention is to provide an interlocking chain type forward and backward actuating device that avoids increases in the number of components, the size of the device, and work in forming the chain guide, avoids the amount of scatter of the lubricating oil to the outside of the device, reduces a chain collision noise and a vibration that occur when the interlocking chain extended in a rigid state is housed again into the chain guide, and achieves reduction in abrasion and avoidance of damage of the coupling pin that couples the plates to each other.

Means for Solving the Problems

To solve the above described problems, the invention according to claim 1 provides an interlocking chain type forward and backward actuating device including a pair of interlocking chains, a driven body, and a chain guide plate. The interlocking chains includes hook-shaped inner tooth plates and hook-shaped outer tooth plates. The hook-shaped outer tooth plates are arranged alternately with the inner tooth plates in a chain longitudinal direction. A large number of the inner tooth plates and the outer tooth plates are coupled to one another in the chain longitudinal direction with coupling pins. The coupling pins extend through the inner tooth plates and the outer tooth plates in a chain width direction. The pair of interlocking chains is driven by a drive sprocket such that the interlocking chains become rigid with the inner tooth plates interlocked and the outer tooth plates interlocked, and such that the interlocking chains bifurcate from each other with the interlocked inner tooth plates being disengaged and the interlocked outer tooth plates being disengaged. The driven body is mounted to the pair of interlocking chains. The driven body is moved forward and backward according to forward and backward movement of the pair of interlocking chains. A chain guide plate and a chain locus regulating means. The chain guide plate includes a disengagement part guide. The disengagement part guide guides a projecting portion of the coupling pin at a chain disengagement part where the interlocking chains are disengaged from each other in the chain width direction. The chain guide plate is arranged respectively at both sides of the pair of interlocking chains in the chain width direction. The chain locus regulating means guides a rigid chain part. The chain locus regulating means includes a chain locus regulating face. The chain locus regulating face contacts the rigid chain part where the interlocking chains are interlocked with each other to become rigid. The chain locus regulating means is slidably arranged at the rigid chain part.

To solve the above described problems, the invention according to claim 2 provides the interlocking chain type forward and backward actuating device according to claim 1 in which the chain locus regulating means includes a pair of chain locus regulating members. The chain locus regulating members bring the respective chain locus regulating faces into contact with outer plate faces from both sides of the rigid chain parts in the chain width direction. The outer plate faces are included in a pair of respective outer tooth plates arranged outermost among the plurality of outer tooth plates included in the rigid chain parts in the chain width direction. The rigid chain part includes a coupling pin, the coupling pin extending through a coupling pin passage in a rigid chain direction. The coupling pin passage is formed at the chain guide plate with the coupling pin passage communicating with the guide for the chain disengagement part. The coupling pin passage has a passage width larger than a guide width of the disengagement part guide.

To solve the above described problems, the invention according to claim 3 provides the interlocking chain type forward and backward actuating device according to claim 2 in which the coupling pin passage forms a groove shape open to the rigid chain part in the chain width direction without extending through the chain guide plate.

To solve the above described problems, the invention according to claim 4 provides the interlocking chain type forward and backward actuating device according to claim 2 or 3 having a spacer located between the pair of chain guide plates. The spacer defines a distance between the pair of chain guide plates. The guide plates are located at both sides of the pair of interlocking chains in the chain width direction.

To solve the above described problems, the invention according to claim 5 provides the interlocking chain type forward and backward actuating device according to claim 1 in which the chain locus regulating means includes a chain locus regulating member. The chain locus regulating member brings the chain locus regulating face into contact with plate side faces of the inner tooth plate and the outer tooth plate included in the rigid chain parts from one side in the chain disengagement direction. The drive sprocket is located on the opposite side from the chain locus regulating member as viewed from the rigid chain parts and engages with one of the interlocking chains.

To solve the above described problems, the invention according to claim 6 provides the interlocking chain type forward and backward actuating device according to claim 5 in which a chain width direction regulating face faces the rigid chain part from the chain width direction. The chain width direction regulating face contacts a distal end of a coupling pin included in the rigid chain part. The chain width direction regulating face forms a part of a chain guide plate face of the chain guide plate.

To solve the above described problems, the invention provides the interlocking chain type forward and backward actuating device according to any one of claim 1 to claim 6 in which the disengagement part guide is a groove-shaped guide open to the chain disengagement part. The disengagement part guide forms the groove-shaped guide. The disengagement part guide includes a grooved bottom face. The grooved bottom face faces a distal end of the coupling pin included in the chain disengagement part.

The interlocking chain type forward and backward actuating device according to claim 1 of the present invention includes a pair of interlocking chains, a driven body, and a chain plate. The interlocking chains include hook-shaped inner tooth plates and hook-shaped outer tooth plates. The hook-shaped outer tooth plates are arranged alternately with the inner tooth plates in a chain longitudinal direction. A large number of the inner tooth plates and the outer tooth plates are coupled to one another in the chain longitudinal direction with coupling pins. The coupling pins extend through the inner tooth plates and the outer tooth plates in a chain width direction. The pair of interlocking chains is driven by a drive sprocket such that the interlocking chains become rigid with the inner tooth plates interlocked and the outer tooth plates interlocked, and such that the pair of interlocking chains bifurcate from each other with the interlocked inner tooth plates being disengaged and the interlocked outer tooth plates being disengaged. The driven body is mounted to the pair of interlocking chains. The driven body is moved forward and backward according to forward and backward movement of the pair of interlocking chains. This allows the driven body to be driven according to the forward and backward movement of the pair of interlocking chains and also provides exceptional advantages corresponding to the following specific configuration.

That is, the interlocking chain type forward and backward actuating device according to claim 1 of the present invention includes a chain guide plate and a chain locus regulating means. The chain guide plate includes a disengagement part guide. The disengagement part guide guides a projecting portion of the coupling pin at a chain disengagement part where the interlocking chains are disengaged from each other in the chain width direction. The chain guide plate is arranged respectively at both sides of the pair of interlocking chains in the chain width direction. The chain locus regulating means guides a rigid chain part. The chain locus regulating means includes a chain locus regulating face. The chain locus regulating face contacts the rigid chain part where the interlocking chains are interlocked with each other to become rigid. The chain locus regulating means is slidably arranged at the rigid chain part. Abrasion between the coupling pins included in the rigid chain parts and the inner wall face of the chain guide is avoided while at least the rigid chain parts are guided by the chain locus regulating face. Also, a collision between the coupling pin and the edge of the inlet of the chain guide is avoided when the rigid chain parts, which are extended from the inlet of the chain guide to the outside of the device, are housed into the inlet of the chain guide again. Further, while the rigid chain parts are guided, the periphery of the rigid chain part is at least partially covered by the chain locus regulating face. Accordingly, an increase in work for forming a chain guide where a complicated guide shape of the chain guide is formed is avoided while reduction in abrasion and avoidance of damage of the coupling pin are achieved. Moreover, a chain collision noise and a vibration are reduced, installation of an additional component such as a cover for preventing lubricating oil from scattering is eliminated, increases in the number of components and the size of the device are avoided, and the amount of scatter of the lubricating oil, which scatters to outside of the device, is reduced.

The interlocking chain type forward and backward actuating device according to claim 2 of the present invention has the following advantages in addition to the advantages provided by the interlocking chain type forward and backward actuating device according to claim 1. The chain locus regulating means includes a pair of chain locus regulating members. The chain locus regulating members bring the respective chain locus regulating faces into contact with outer plate faces from both sides of the rigid chain parts in the chain width direction. The outer plate faces is included in a pair of respective outer tooth plates arranged outermost among the plurality of outer tooth plates included in the rigid chain parts in the chain width direction. The rigid chain part includes a coupling pin. The coupling pin extends through a coupling pin passage in a rigid chain direction. The coupling pin passage is formed at the chain guide plate with the coupling pin passage communicating with the guide for the chain disengagement part. The coupling pin passage has a passage width larger than a guide width of the disengagement part guide. Accordingly, a closely contacting state between the coupling pins included in the rigid chain parts and the passage walls of the coupling pin passages can be avoided. Additionally, the rigid chain parts are guided from both sides of the rigid chain parts in the chain width direction to avoid wobbling of the rigid chain parts in a chain width direction when the chains drive. Moreover, the chain disengagement parts and the rigid chain parts are separately guided with the disengagement part guides and the chain locus regulating faces, respectively while the rigid chain parts are covered from both sides of the rigid chain parts with the pair of chain locus regulating faces. Accordingly, abrasion of the coupling pin is further reduced by avoiding abrasion between the coupling pins included in the rigid chain parts and the chain guides. This further reliably achieves avoidance of dual regulations that guide both the coupling pin and the outer plate face simultaneously and reduction in abrasion of the coupling pin based on smooth chain locus regulation. Furthermore, collision of the edge of the inlet of the chain guide with the coupling pin is avoided, reliably achieving avoidance of damage of the coupling pin. Installation of an additional component such as a cover for preventing lubricating oil from scattering is eliminated, and therefore increases in the number of components and the size of the device are further avoided. The amount of scatter of the lubricating oil to the outside of the device is effectively reduced.

The interlocking chain type forward and backward actuating device according to claim 3 of the present invention has the following advantages in addition to the advantages provided by the interlocking chain type forward and backward actuating device according to claim 2. The coupling pin passage forms a groove shape open to the rigid chain part in the chain width direction without extending through the chain guide plate. Since the coupling pin passage covers the coupling pin included in the rigid chain part, the amount of scatter of the lubricating oil to the outside of the device can be further reduced.

The interlocking chain type forward and backward actuating device according to claim 4 of the present invention has the following advantages in addition to the advantages provided by the interlocking chain type forward and backward actuating device according to claim 2 or claim 3. A spacer is located between the pair of chain guide plates. The spacer defines a distance between the pair of chain guide plates. The pair of chain guide plates is located at both sides of the pair of interlocking chains in the chain width direction. Adjusting the distance between the chain guide plates adjusts a chain regulating force. The chain regulating force is applied from a pair of respective chain locus regulating faces to the rigid chain parts in the chain width direction. This appropriately adjusts the chain regulating force according to size change of the interlocking chains in the chain width direction, achieving further reliably reduced abrasion of the coupling pin.

The interlocking chain type forward and backward actuating device according to claim 5 of the present invention has the following advantages in addition to the advantages provided by the interlocking chain type forward and backward actuating device according to claim 1. The chain locus regulating means includes a chain locus regulating member. The chain locus regulating member brings the chain locus regulating face into contact with plate side faces of the inner tooth plate and the outer tooth plate included in the rigid chain parts from one side in the chain disengagement direction. The drive sprocket is located on an opposite side from the chain locus regulating member as viewed from the rigid chain parts and engages with one of the pair of interlocking chains. This avoids contact between the coupling pins included in the rigid chain parts and the inner wall face of the chain guide. Also, when the chains drive, wobbling of the rigid chain parts in the chain disengagement direction is avoided. Moreover, the chain disengagement parts and the rigid chain parts are separately guided with the guide for the chain disengagement part and the chain locus regulating face, respectively while the rigid chain part is covered by the chain locus regulating face. This further reliably achieves reduction in abrasion of the coupling pin and also avoids dual regulations that guide both the coupling pin and the outer tooth plate simultaneously, so as to reduce abrasion of the coupling pin based on smooth chain locus regulation. Furthermore, a collision of the edge of the inlet of the chain guide with the coupling pin is avoided, reliably achieving avoidance of damage of the coupling pin. Installation of an additional component such as a cover for preventing lubricating oil from scattering is eliminated, and therefore increases in the number of components and the size of the device are further avoided. The amount of scatter of the lubricating oil to the outside of the device is effectively reduced.

The interlocking chain type forward and backward actuating device according to claim 6 of the present invention has the following advantages in addition to the advantages provided by the interlocking chain type forward and backward actuating device according to claim 5. A chain width direction regulating face faces the rigid chain part from the chain width direction. The chain width direction regulating face contacts a distal end of a coupling pin included in the rigid chain part. The chain width direction regulating face forms a part of a chain guide plate face of the chain guide plate. Accordingly, when the chain drives, wobbling of the rigid chain parts is avoided both in the chain disengagement direction and the chain width direction, and also covers the coupling pin from the chain width direction. Therefore, when the rigid chain parts extended from the inlet of the chain guide to the outside of the device are housed from the inlet of the chain guide again, the edge of the inlet of the chain guide does not collide with the coupling pin. This further reliably avoids damage of the coupling pin and further reduces the amount of scatter of the lubricating oil outside of the device.

The interlocking chain type forward and backward actuating device of the present invention has the following advantages in addition to the advantages provided by the interlocking chain type forward and backward actuating device according to any of claims 1 to 6. The disengagement part guide is a groove-shaped guide open to the chain disengagement part. The disengagement part guide forms the groove-shaped guide. The disengagement part guide includes a grooved bottom face. The grooved bottom face faces a distal end of the coupling pin included in the chain disengagement part. Accordingly, the coupling pin included in the chain disengagement part is covered by the disengagement part guide from the chain width direction. This reliably avoids scatter of the lubricating oil from the interlocking chain to the outside of the device after the interlocking chains are disengaged from each other.

DETAILED DESCRIPTION OF THE PREFERRED EMBODIMENTS

Figure 1:
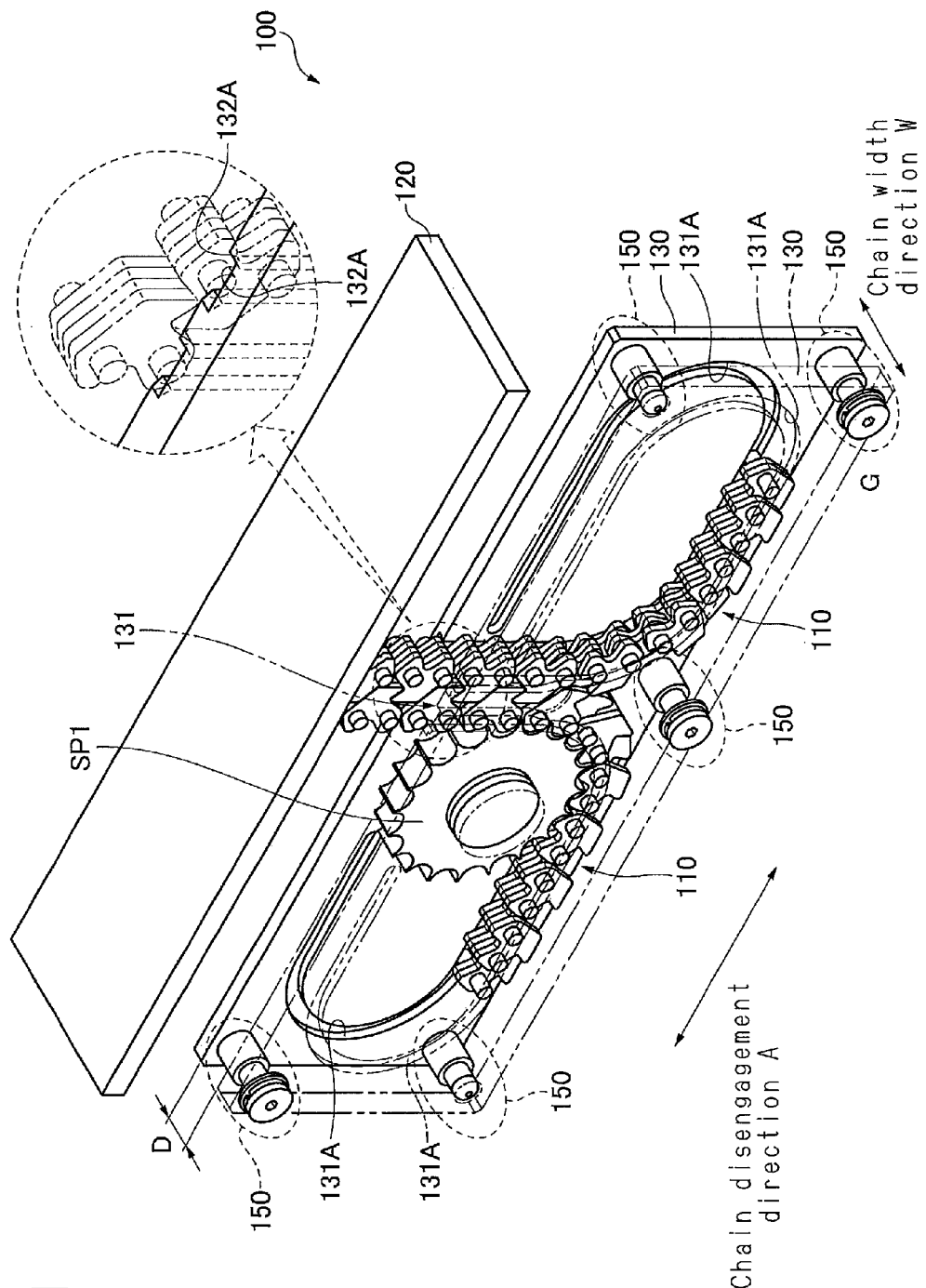
FIG. 1 is a perspective view of an interlocking chain type forward and backward actuating device according to a first embodiment of the present invention.

An interlocking chain type forward and backward actuating device according to the present invention includes hook-shaped inner tooth plates, hook-shaped outer tooth plates, coupling pins, a pair of interlocking chains, a driven body, a chain guide plate, and a chain locus regulating means. Any specific aspect of the embodiments is possible insofar as the following is met. The hook-shaped outer tooth plates are arranged alternately with the hook-shaped inner tooth plates in the chain longitudinal direction. The coupling pin extends through the inner tooth plates and the outer tooth plates in the chain width direction. A large number of the inner tooth plates and the outer tooth plates are coupled to one another in the chain longitudinal direction with the coupling pins. The pair of interlocking chains is driven by a drive sprocket such that the interlocking chains become rigid with the inner tooth plates interlocked and the outer tooth plates interlocked, and such that the pair of interlocking chains bifurcate from each other with the interlocked inner tooth plates being disengaged and the interlocked outer tooth plates being disengaged. The driven body is mounted to the pair of interlocking chains and is moved forward and backward according to the forward and backward movement of the pair of interlocking chains. The chain guide plates include a disengagement part guide. The disengagement part guide guides a projecting portion of the coupling pin at the chain disengagement part where the pair of interlocking chains is respectively disengaged from the chain width direction. The chain guide plates are located at both sides of the pair of interlocking chains in the chain width direction. The chain locus regulating means guides the rigid chain part. The chain locus regulating means includes a chain locus regulating face. The chain locus regulating face contacts the rigid chain part where the interlocking chains are interlocked with each other to become rigid. The chain locus regulating means is slidably located at the rigid chain part.

For example, regarding the specific shapes of plates such as inner tooth plates and outer tooth plates, any shape may be used as long as plates of the same type facing one another integrally engage with each other and are disengaged from each other to bifurcate.

The interlocking chain may be constituted by a plurality of rows of chain units in which a large number of link units are respectively coupled in the chain longitudinal direction. The link unit includes inner tooth plates and outer tooth plates located outside of the inner tooth plates. An inner tooth plate and an outer tooth plate constitute one set of the link unit facing in the chain width direction. The interlocking chain may also be constituted by a chain unit of a single row.

The chain locus regulating means may be a chain locus regulating member formed integrally with or separately from the chain guide plate.

The guide for the chain disengagement part may have a shape that extends through the chain guide plate and may be a groove-shaped guide that does not extend through the chain guide plate.

The groove-shaped disengagement part guide is preferred because the amount of scatter of the lubricating oil to the outside of the device after the interlocking chains are disengaged from each other can be reliably reduced.

In the case where the disengagement part guides formed in a shape that extends through the chain guide plate, the thickness of the chain guide plate can be reduced by the amount that corresponds to the structure with no groove-shaped guide as the disengagement part guide. This is preferred in that the entire device reduces weight.

Additionally, a gap may be provided between a peripheral face of the projecting portion of the coupling pin or a distal end of the coupling pin and the disengagement part guide to reduce contact resistance between the coupling pin and the disengagement part guide. A gap may be provided between the coupling pin included in the rigid chain part and an inner wall face of a coupling pin passage, through which the coupling pin extends, to reduce contact resistance between the coupling pin and the coupling pin passage and to prioritize guidance of the rigid chain part with the chain locus regulating face.

With the coupling pin passage with a groove shape and the disengagement part guide to be a groove-shaped guide, a gap, namely, a clearance may be provided between the distal end and a grooved bottom face of the coupling pin to the extent that the coupling pin can be guided.

The driven body may be directly mounted to the pair of interlocking chains and may be indirectly mounted to the pair of interlocking chains via a coupling plate.

The interlocking chain type forward and backward actuating device according to the present invention does not cause any problem in forward and backward operations even if an installation face is a floor face where the interlocking chain type forward and backward actuating device stands or a ceiling face where the interlocking chain type forward and backward actuating device is suspended. Further, even if the installation face is a vertical wall face where the interlocking chain type forward and backward actuating device is cantilevered, the above-described forward and backward operations do not cause any problem.

Embodiments

The following describes interlocking chain type forward and backward actuating devices 100, 200, and 300 according to embodiments of the present invention with reference to FIGS. 1 to 15.

Figure 2:
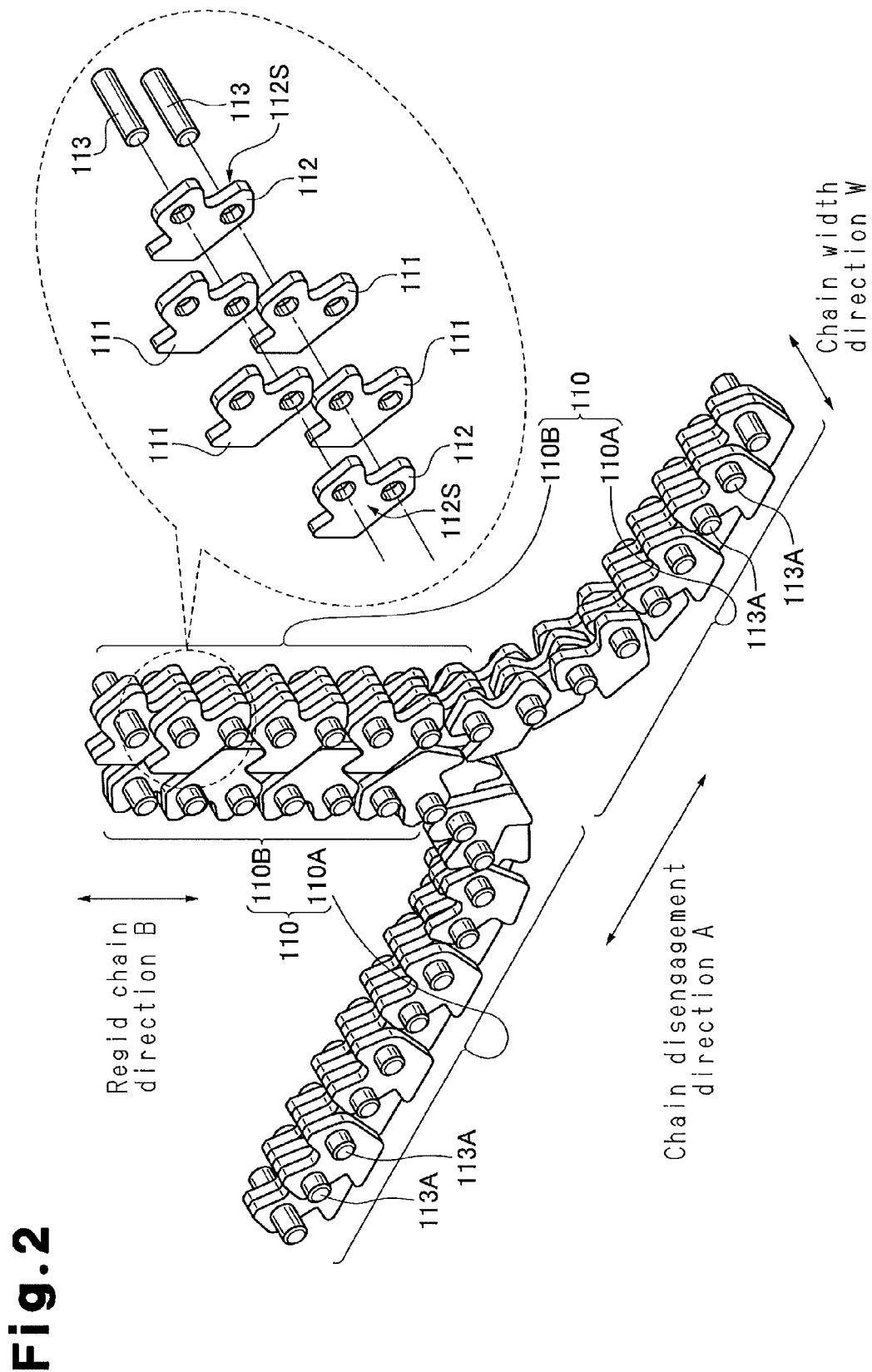
FIG. 2 is an assembly perspective view showing exploded and assembled states of the interlocking chain.
Figure 3:
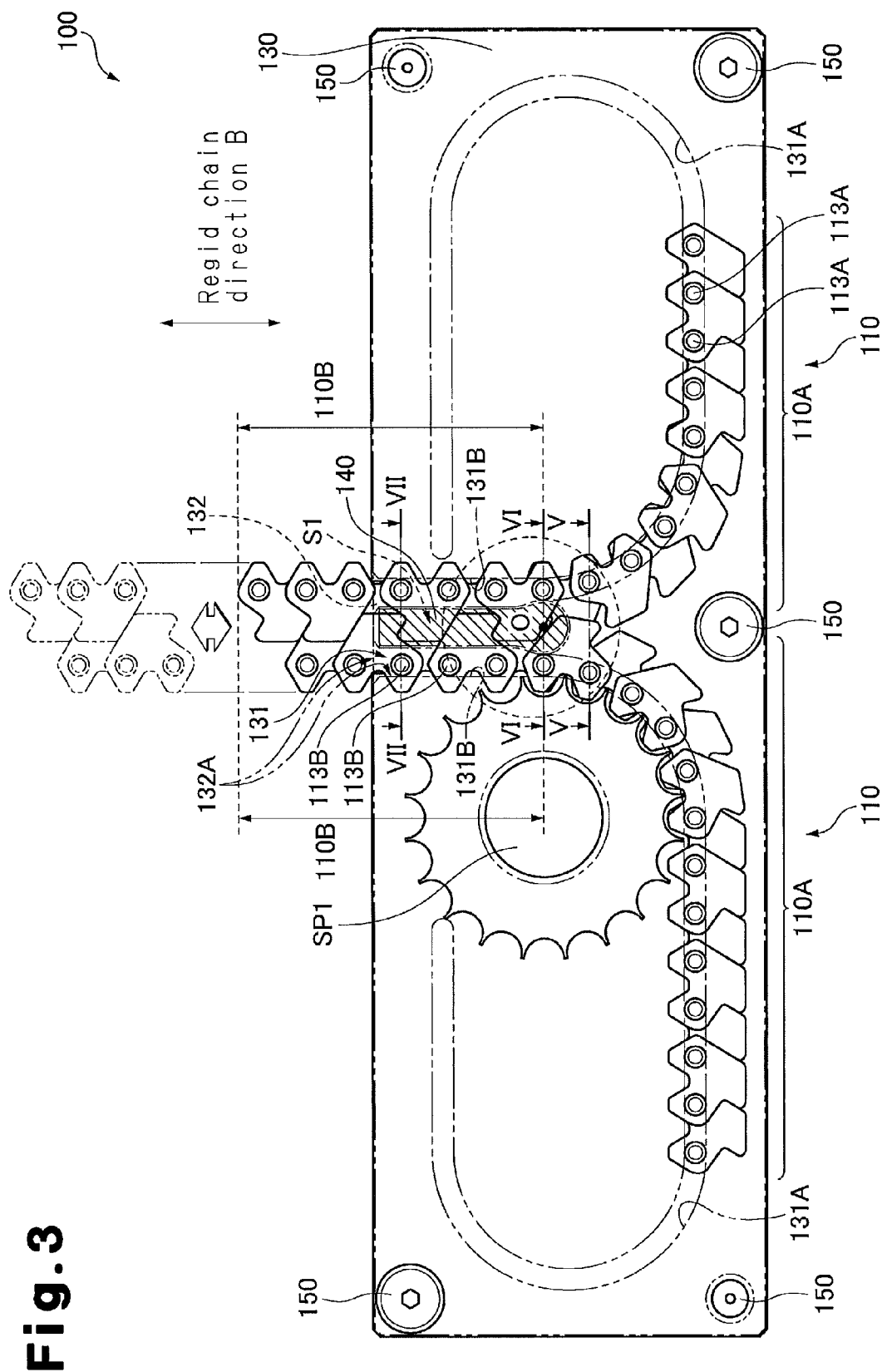
FIG. 3 is a front view of the interlocking chain type forward and backward actuating device according to the first embodiment of the present invention.
Figure 4:
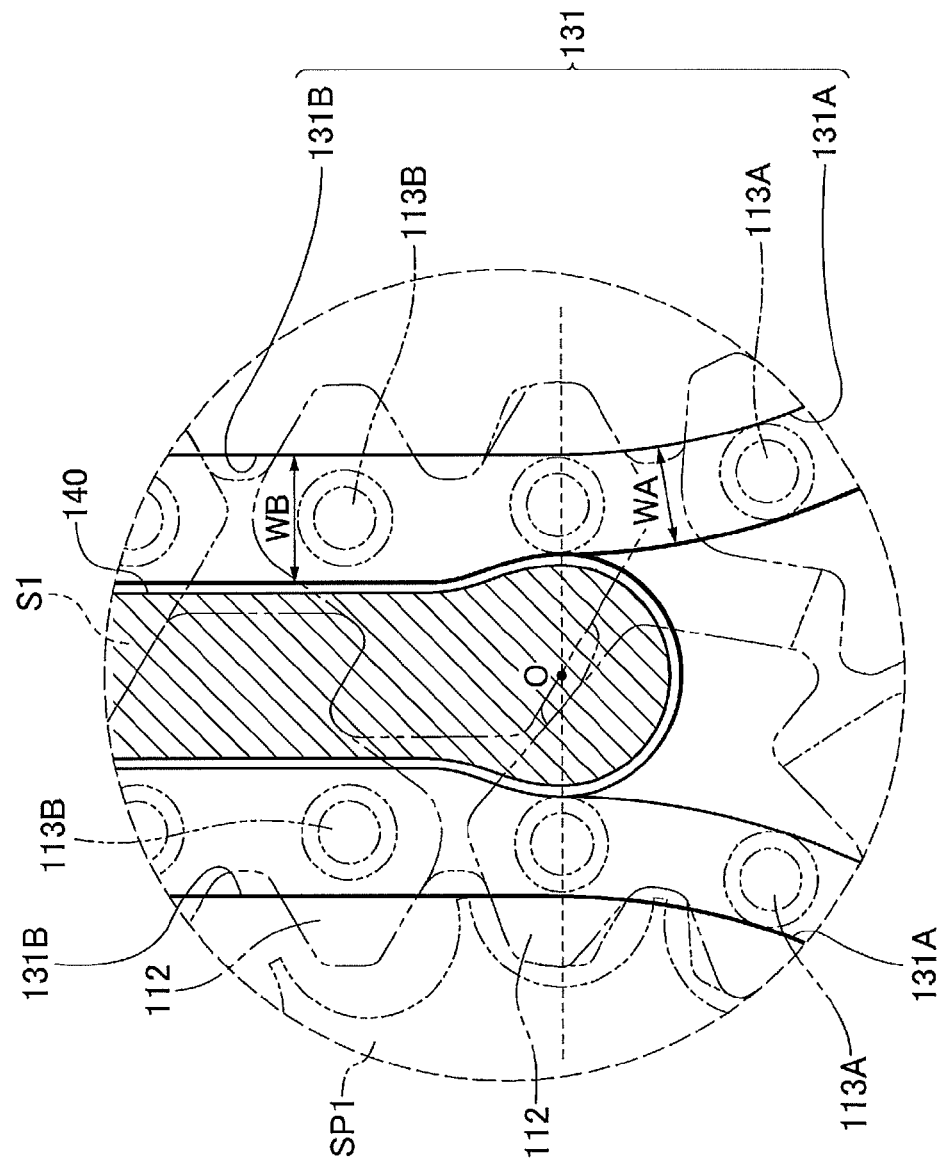
FIG. 4 is an enlarged front view near a chain disengagement position O.
Figure 5:
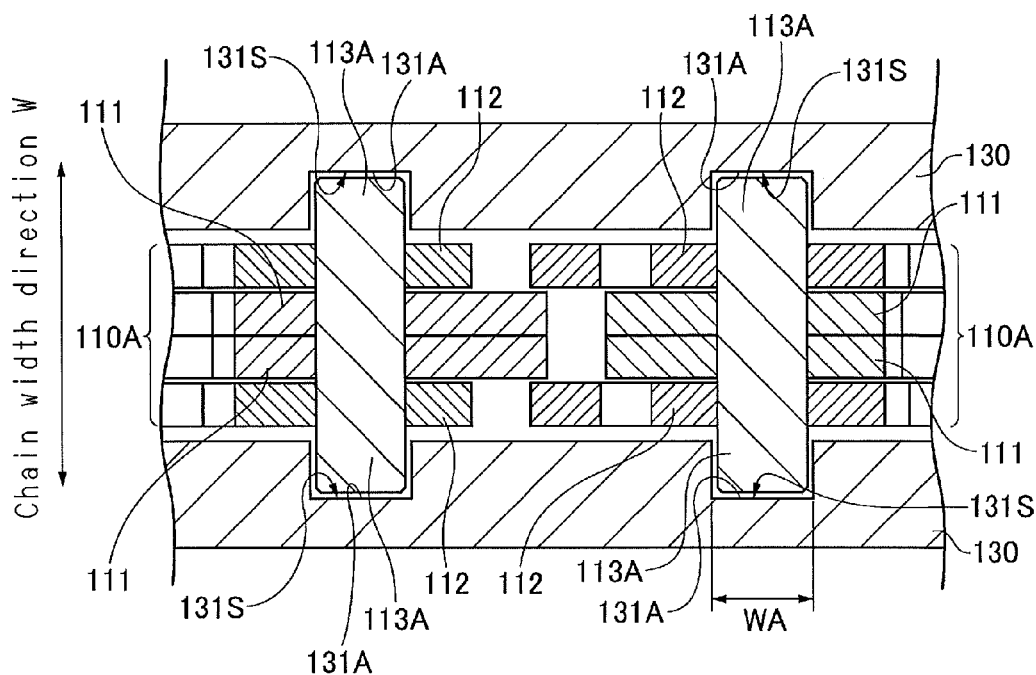
FIG. 5 is a cross-sectional view taken along line V-V of FIG. 3.
Figure 6:
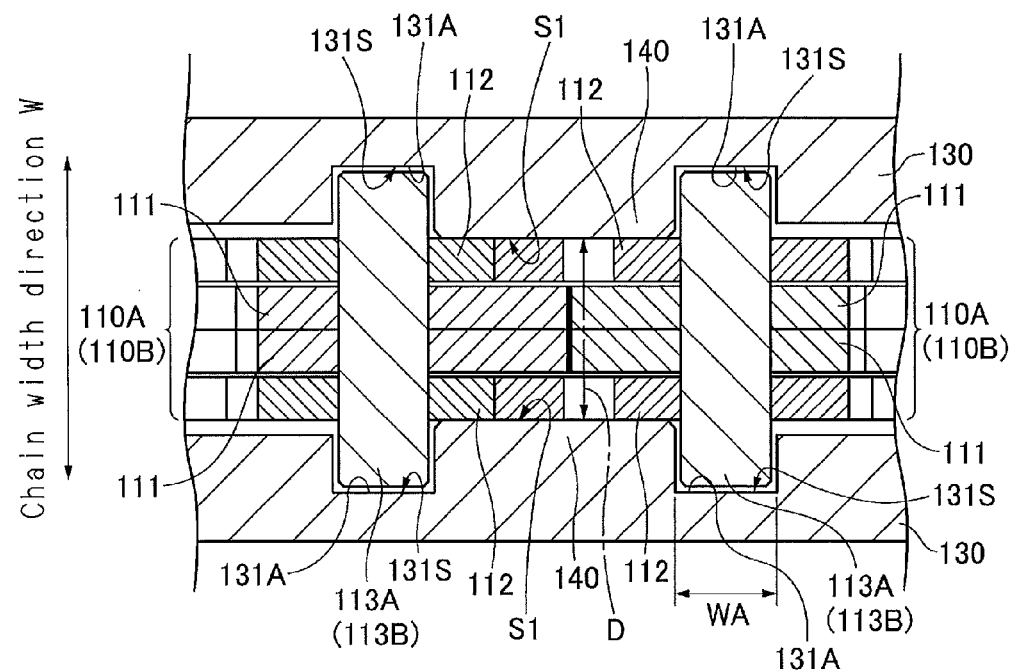
FIG. 6 is a cross-sectional view taken along line VI-VI of FIG. 3.
Figure 7:
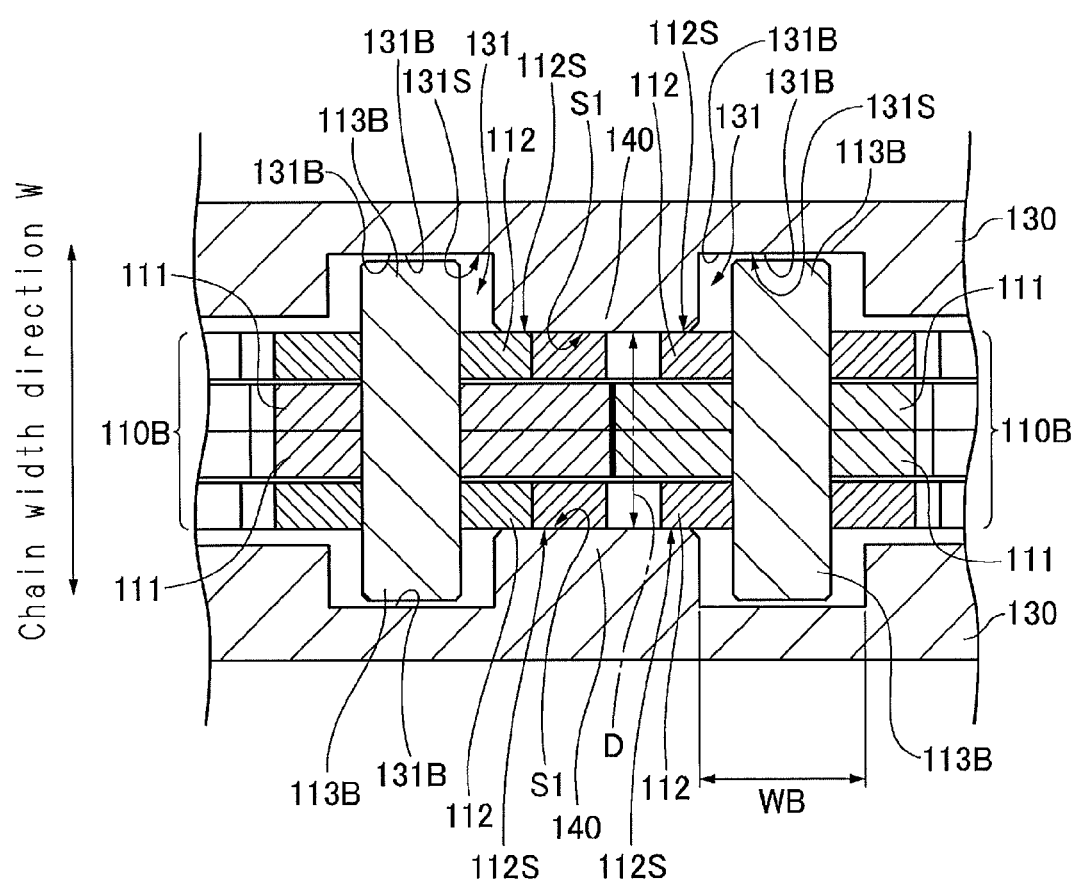
FIG. 7 is a cross-sectional view taken along line VII-VII of FIG. 3.
Figure 8:
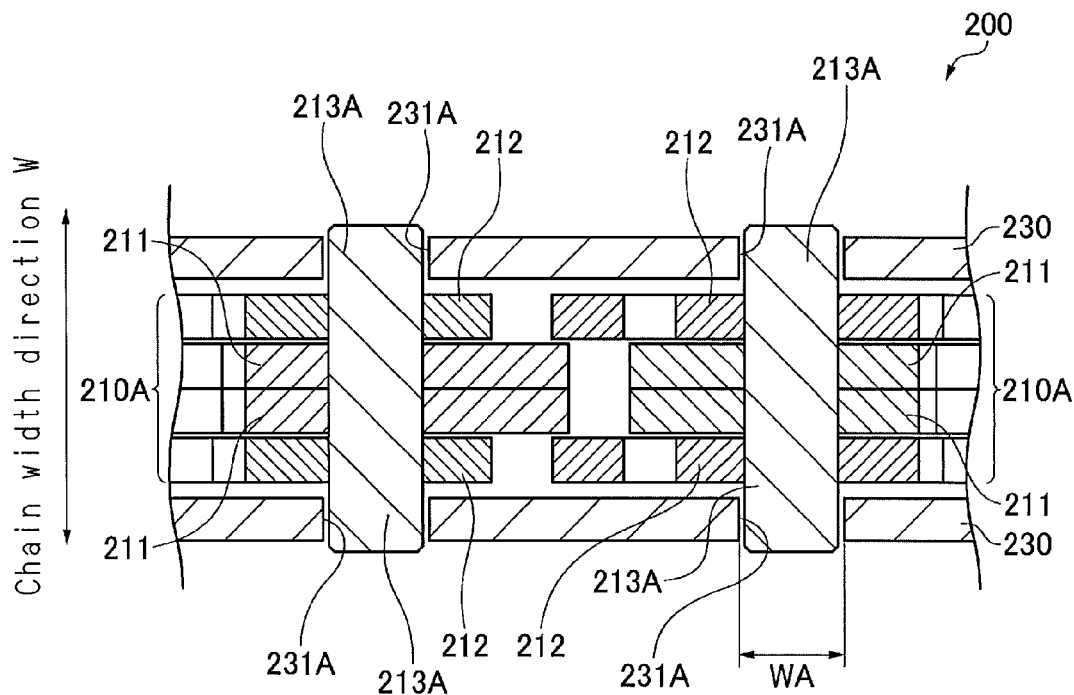
FIG. 8 is a partial cross-sectional view corresponding to FIG. 5, illustrating an interlocking chain type forward and backward actuating device according to a second embodiment of the present invention.
Figure 9:
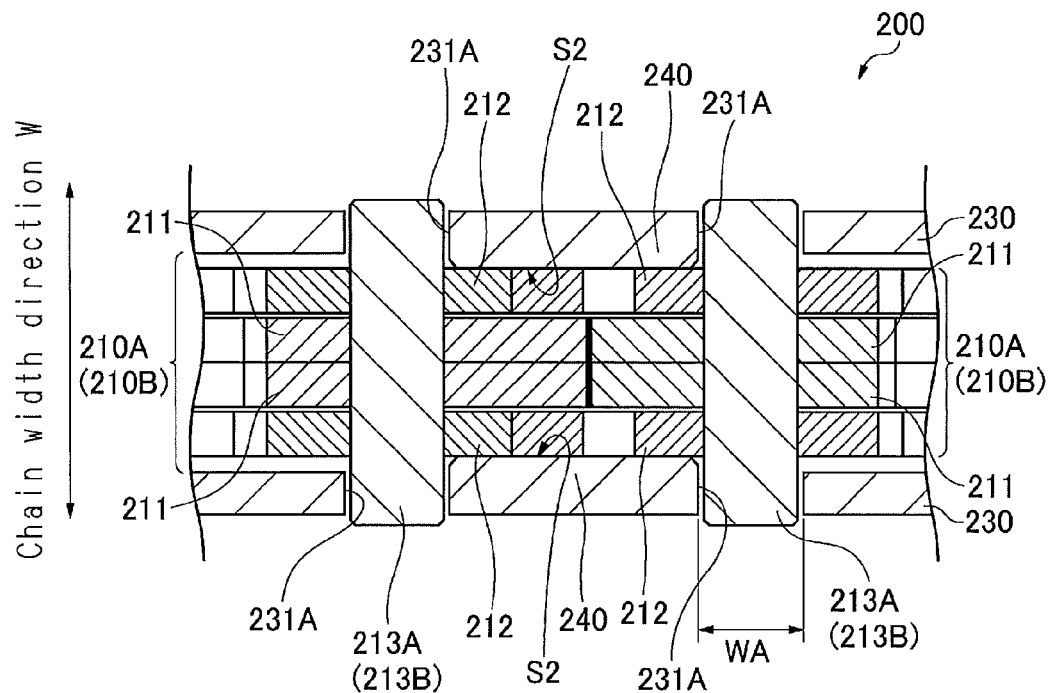
FIG. 9 is a partial cross-sectional view corresponding to FIG. 6, illustrating the interlocking chain type forward and backward actuating device according to the second embodiment of the present invention.
Figure 10:
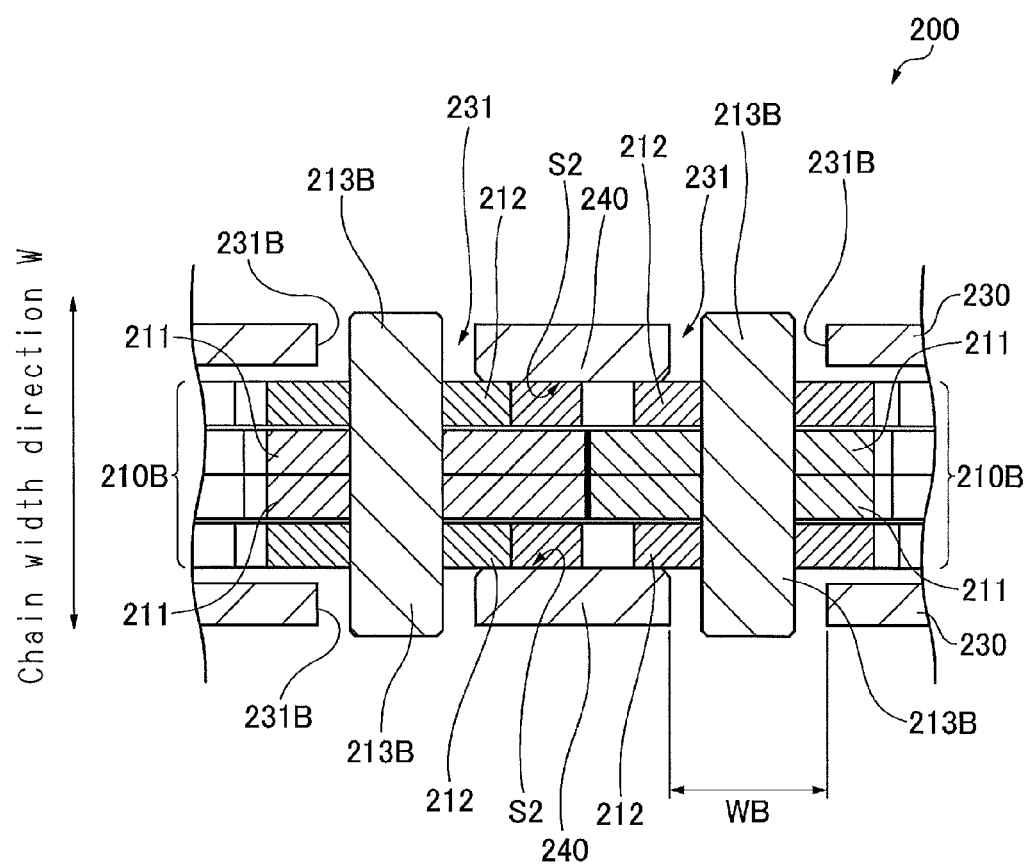
FIG. 10 is a partial cross-sectional view corresponding to FIG. 7, illustrating the interlocking chain type forward and backward actuating device according to the second embodiment of the present invention.
Figure 11:
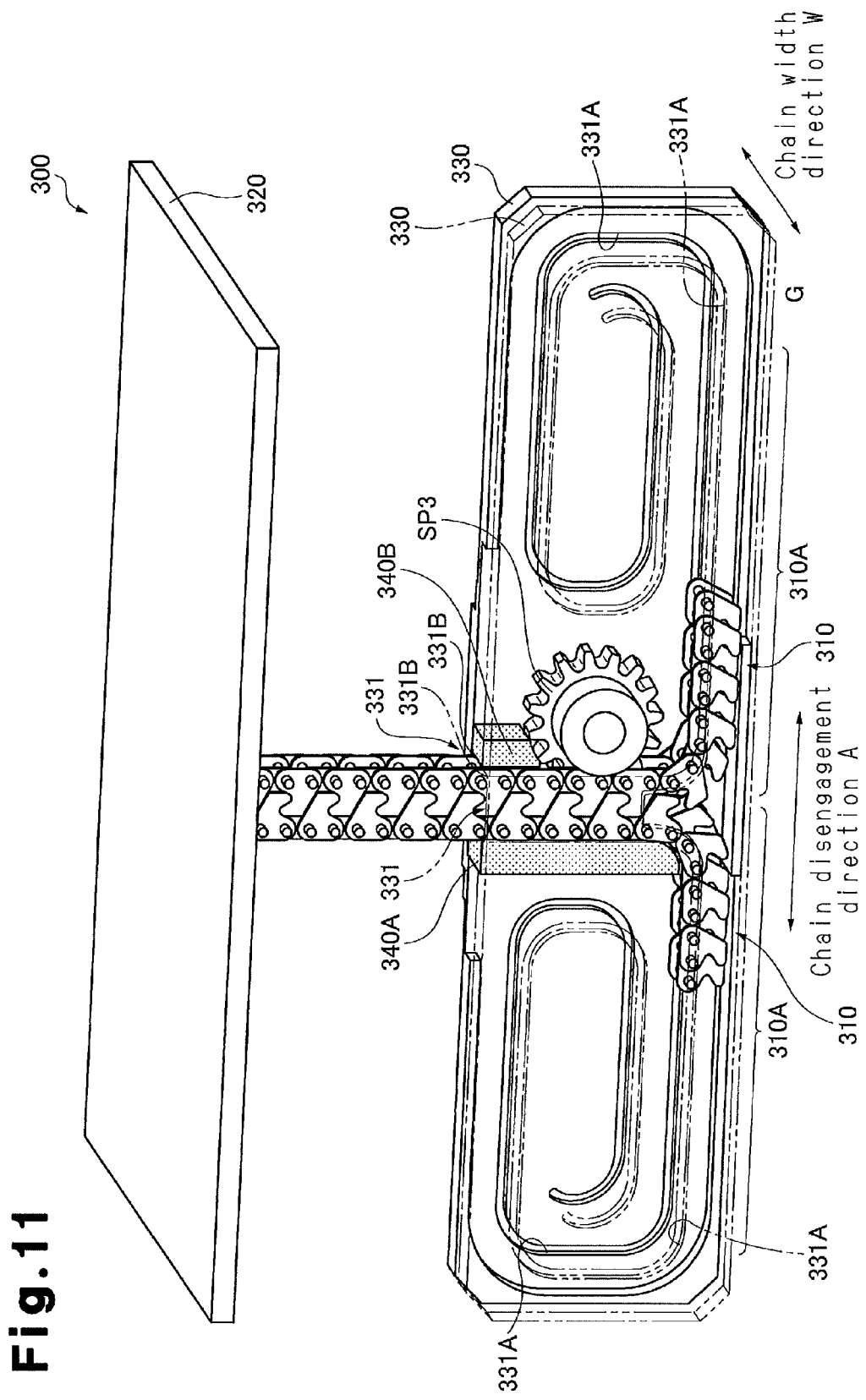
FIG. 11 is a perspective view of an interlocking chain type forward and backward actuating device according to a third embodiment of the present invention.
Figure 12:
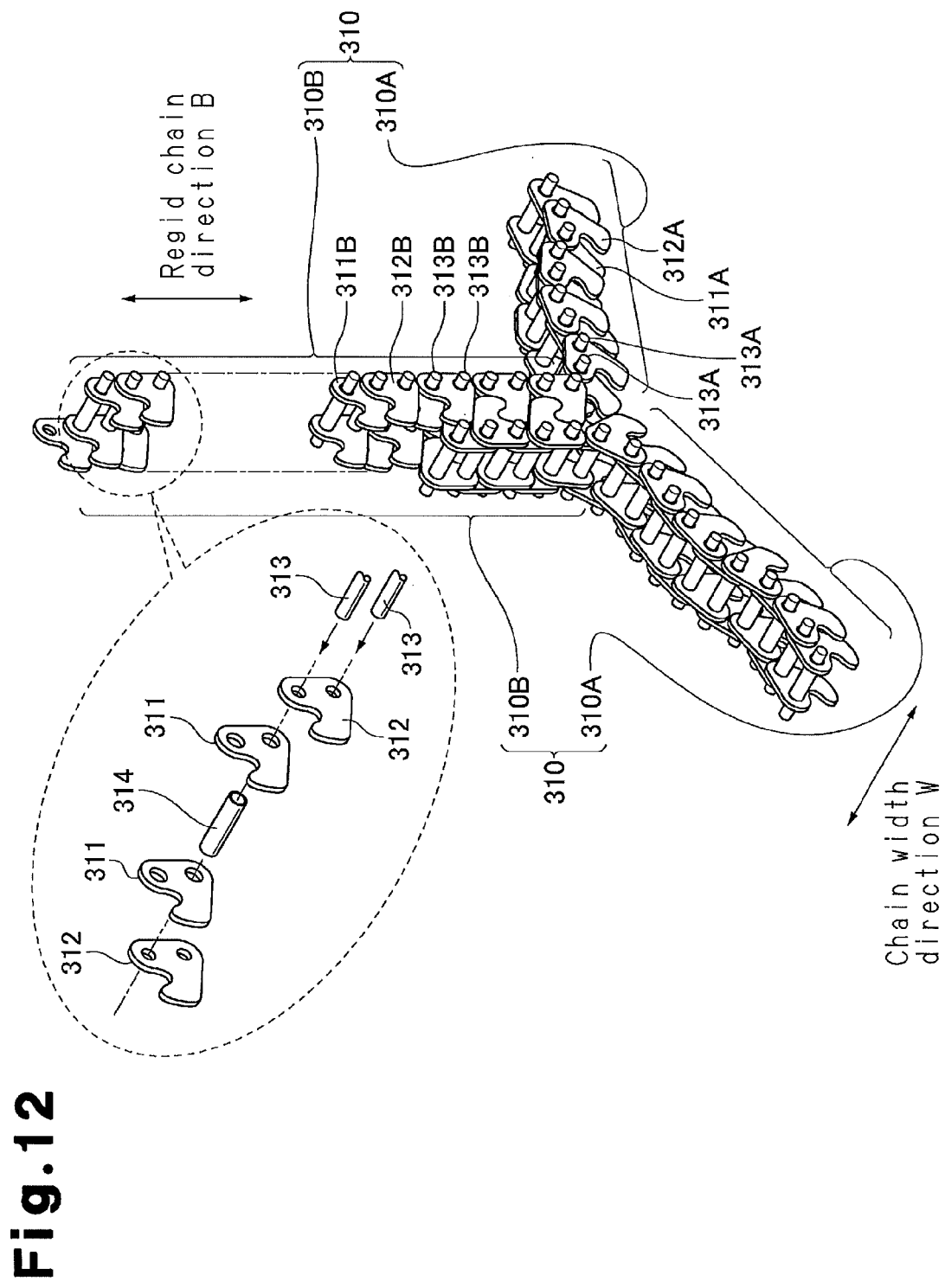
FIG. 12 is an assembly perspective view where exploded and assembled states of an interlocking chain used for the interlocking chain type forward and backward actuating device according to the third embodiment of the present invention are illustrated.
Figure 13:
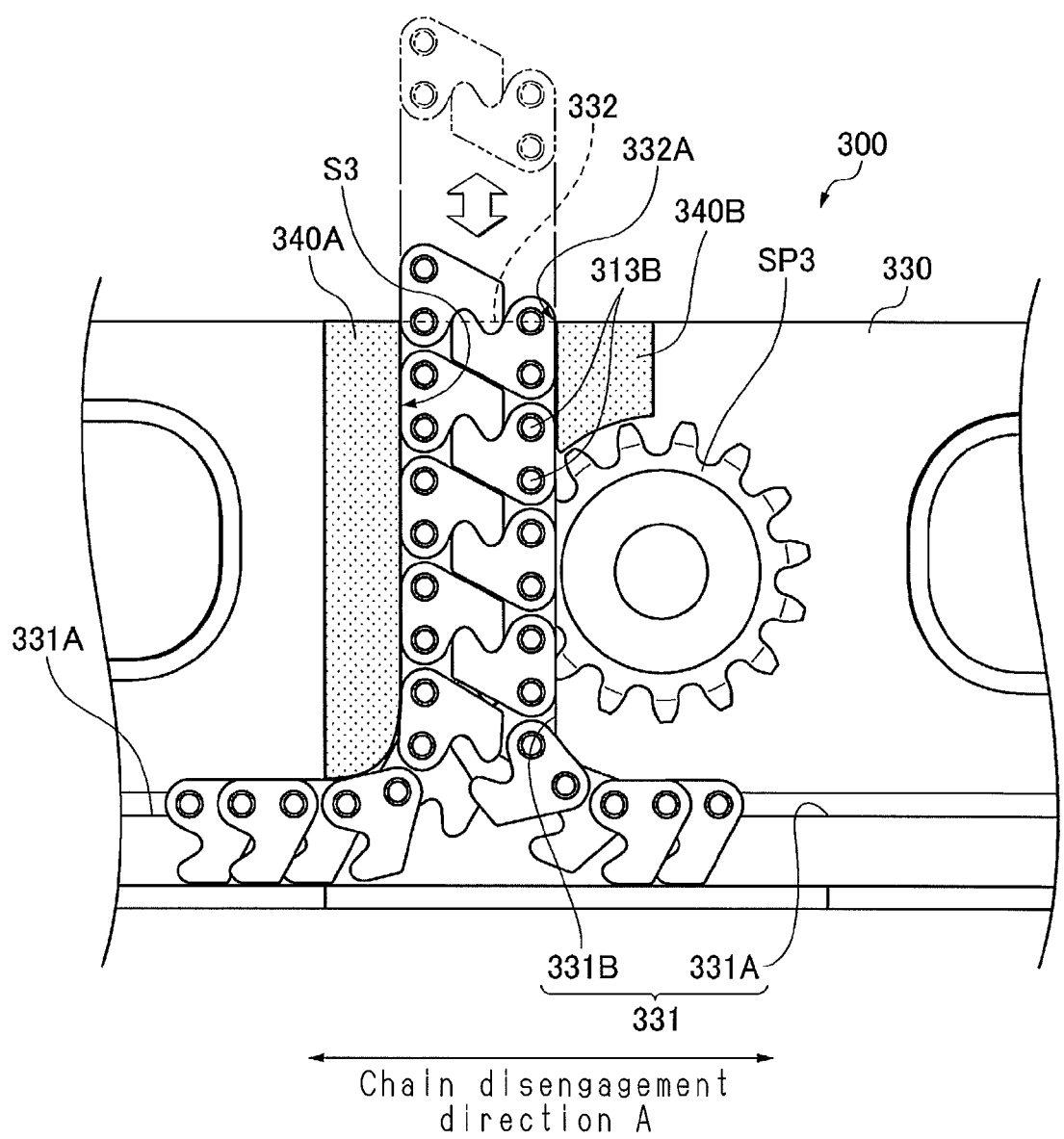
FIG. 13 is an enlarged front view near a chain disengagement position in the interlocking chain type forward and backward actuating device according to the third embodiment of the present invention.
Figure 14:
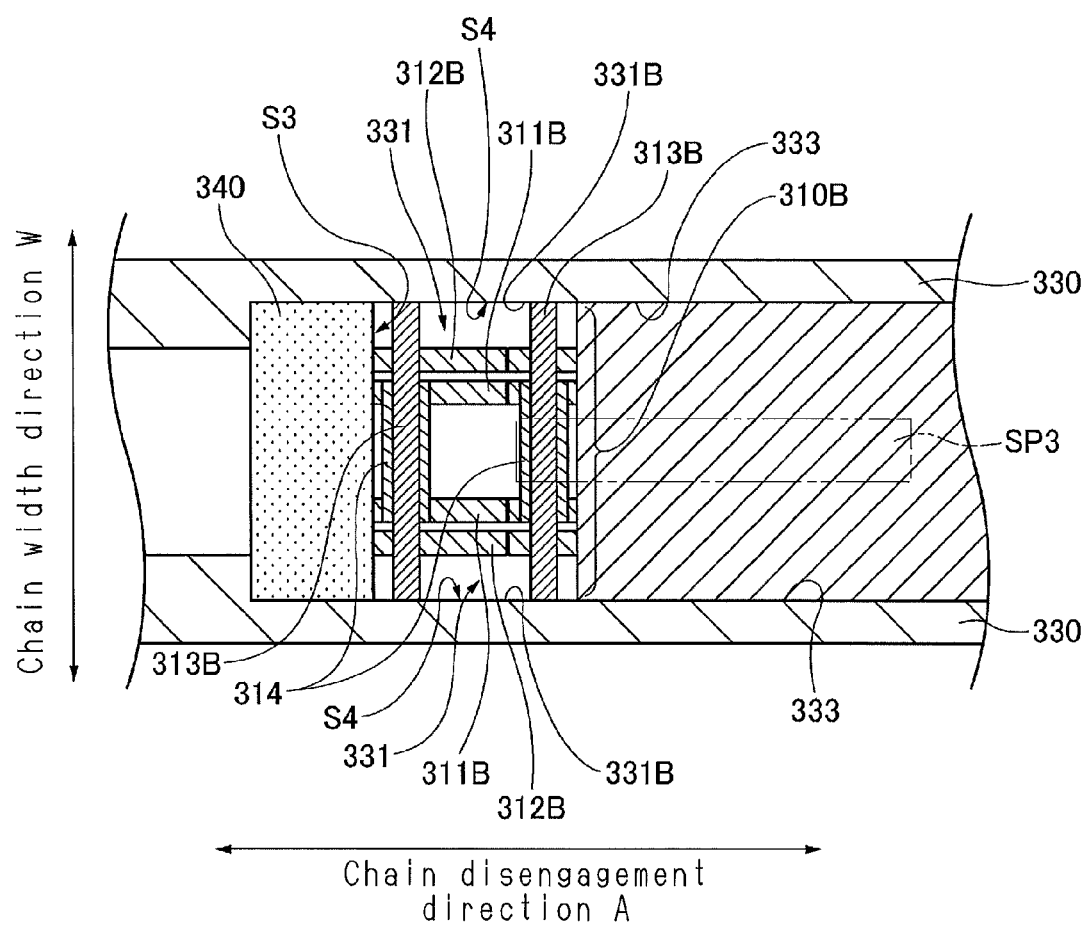
FIG. 14 is a partial plan view of the interlocking chain type forward and backward actuating device according to the third embodiment of the present invention.
Figure 15:
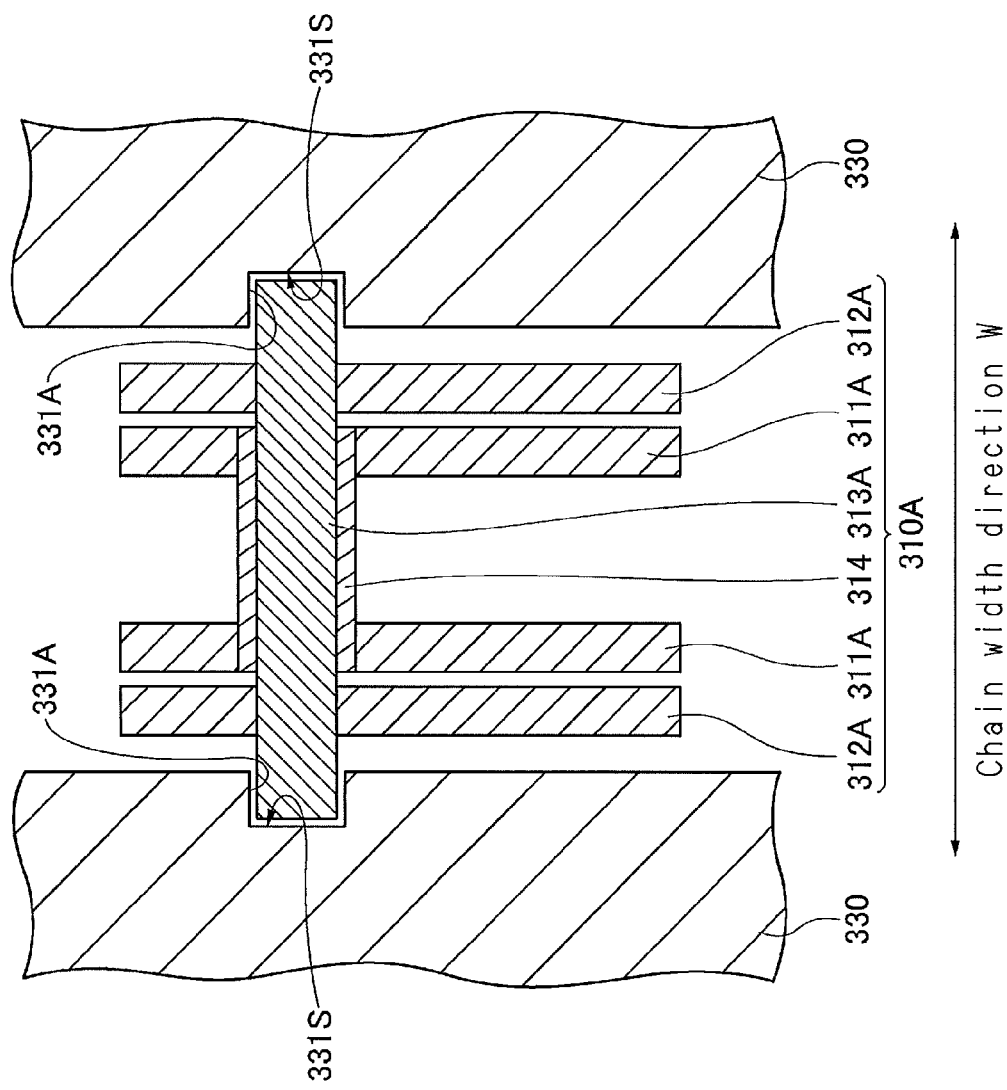
FIG. 15 is a cross-sectional view of a disengagement part guide in the interlocking chain type forward and backward actuating device according to the third embodiment of the present invention.

FIG. 1 is a perspective view of an interlocking chain type forward and backward actuating device according to a first embodiment of the present invention. FIG. 2 is an assembly perspective view showing exploded and assembled states of an interlocking chain. FIG. 3 is a front view of the interlocking chain type forward and backward actuating device according to the first embodiment of the present invention. FIG. 4 is an enlarged front view near the chain disengagement position O. FIG. 5 is a cross-sectional view taken along line V-V of FIG. 3. FIG. 6 is a cross-sectional view taken along line VI-VI of FIG. 3. FIG. 7 is a cross-sectional view taken along the VII-VII of FIG. 3. FIG. 8 is a partial cross-sectional view corresponding to FIG. 5, illustrating an interlocking chain type forward and backward actuating device according to a second embodiment of the present invention. FIG. 9 is a partial cross-sectional view corresponding FIG. 6, illustrating the interlocking chain type forward and backward actuating device according to the second embodiment of the present invention. FIG. 10 is a partial cross-sectional view corresponding to FIG. 7, illustrating the interlocking chain type forward and backward actuating device according to the second embodiment of the present invention. FIG. 11 is a perspective view of an interlocking chain type forward and backward actuating device according to a third embodiment of the present invention. FIG. 12 is an assembly perspective view where exploded and assembled states of an interlocking chain used for the interlocking chain type forward and backward actuating device according to the third embodiment of the present invention are illustrated. FIG. 13 is an enlarged front view near a chain disengagement position in the interlocking chain type forward and backward actuating device according to the third embodiment of the present invention. FIG. 14 is a partial plan view of the interlocking chain type forward and backward actuating device according to the third embodiment of the present invention. FIG. 15 is a cross-sectional view of a disengagement part guide in the interlocking chain type forward and backward actuating device according to the third embodiment of the present invention.

First Embodiment

First, the interlocking chain type forward and backward actuating device 100 according to the first embodiment will be described with reference to FIGS. 1 to 7.

As shown in FIGS. 1 and 2, the interlocking chain type forward and backward actuating device 100 according to the first embodiment includes a pair of interlocking chains 110 and 110, and a driven body 120 as a basic device configuration. Each interlocking chain 110 includes hook-shaped inner tooth plates 111, hook-shaped outer tooth plates 112, coupling pins 113. Each hook-shaped outer tooth plate 112 is shifted in the chain longitudinal direction relative to the corresponding inner tooth plate 111. The coupling pins 113 extend through inner tooth plates 111 and outer tooth plates 112 in a chain width direction W. A large number of the inner tooth plates 111 and the outer tooth plates 112 are coupled to one another in the chain longitudinal direction with the coupling pins 113. The pair of interlocking chains 110 and 110 is driven by a drive sprocket SP1. The interlocking chains 110 and 110 are interlocked with each other to become rigid at the inner tooth plates 111 and the outer tooth plates 112. Also, the pair of interlocking chains 110 and 110 disengages from each other at the inner tooth plates 111, which are respectively engaged, and the outer tooth plates 112, which are respectively engaged, in chain disengagement direction A to bifurcate them from one another. The driven body 120 is mounted to the pair of interlocking chains 110 and 110, and is moved forward and backward according to the forward and backward operations of the pair of interlocking chains 110 and 110. The interlocking chain type forward and backward actuating device 100 is installed on an installation face G. The driven body 120, such as a table, where a conveyed matter such as a heavy load (not shown) is mounted moves up and down parallel to the installation face G.

Next, a specific configuration most characteristic to the interlocking chain type forward and backward actuating device 100 according to the first embodiment will be described in detail with reference to FIGS. 1 to 7.

The interlocking chain type forward and backward actuating device 100 according to the first embodiment, as shown in FIGS. 1 to 7, includes the respective chain guide plates 130 at both sides of the pair of interlocking chains 110 and 110 in the chain width direction W. The chain guide plate 130 includes a chain guide 131 with a disengagement part guide 131A that guides chain disengagement parts 110A and 110A. The chain guide 131 houses the projecting portions of coupling pins 113A included in the chain disengagement parts 110A and 110A, where the pair of interlocking chains 110 and 110 disengages in the chain width direction W. Chain locus regulating member 140 guides the rigid chain parts 110B and 110B. The chain locus regulating members 140 include a chain locus regulating face S1. The chain locus regulating faces S1 contact the rigid chain parts 110B and 110B, where the interlocking chains 110 and 110 are interlocked with each other to become rigid. By slidably arranging the chain locus regulating members 140 at the rigid chain parts 110B and 110B as a chain locus regulating means, abrasion between coupling pins 113B included in the rigid chain part 110B and the inner wall face of the chain guide 131 is avoided while at least the rigid chain parts 110B and 110B are guided with the chain locus regulating faces S1 and S1. Also, a collision between the coupling pins 113B and an edge 132A of an inlet 132 of the chain guide 131 is avoided when the rigid chain parts 110B and 110B, which are extended from the inlet 132 of the chain guide 131 to the outside of the device, are housed in the inlet 132 of the chain guide 131 again. Further, while the rigid chain parts 110B and 110B are guided, the peripheries of the rigid chain parts 110B and 110B are at least partially covered by the chain locus regulating faces S1 and S1. Accordingly, the interlocking chain type forward and backward actuating device 100 avoids an increase in work for forming a chain guide where a complicated guide shape of the chain guide is formed while reduction in abrasion and avoidance of damage of the coupling pin 113 are achieved. Moreover, a chain collision noise and a vibration are reduced, installation of an additional component such as a cover for preventing lubricating oil from scattering is eliminated, increases in the number of components and the size of the device are avoided, and the amount of scatter of the lubricating oil, which scatters to outside of the device, is reduced.

In detail, as shown in FIGS. 3 to 7, the pair of chain locus regulating members 140 and 140 brings the respective chain locus regulating faces S1 and S1 into contact with outer plate faces 112S and 112S from both sides of the rigid chain parts 110B and 110B in the chain width direction W. The outer plate faces 112S and 112S are included in the pair of respective outer tooth plates 112 arranged at the outermost positions among the plurality of outer tooth plates 112 included in the rigid chain parts 110B and 110B in the chain width direction W. Coupling pin passages 131B and 131B, where the coupling pins 113B included in the rigid chain parts 110B and 110B extend through in a rigid chain direction B, are formed at the chain guide plates 130 with the coupling pin passages 131B and 131B communicating with the disengagement part guides 131A. Since a passage width WB of the coupling pin passage 131B is larger than a guide width WA of the disengagement part guide 131A, a closely contacting state is avoided between the coupling pins 113B included in the rigid chain parts 110B and 110B and the passage walls of the coupling pin passages 131B. Additionally, guiding the rigid chain parts 110B and 110B from both sides of the rigid chain parts 110B and 110B in the chain width direction W avoids wobbling of the rigid chain parts 110B and 110B in the chain width direction W when the chain drives. Moreover, the chain disengagement parts 110A and 110A and the rigid chain parts 110B and 110B are separately guided with the disengagement part guides 131A and 131A and the chain locus regulating faces S1 and S1, respectively while the loci of the rigid chain parts 110B and 110B are regulated from both sides of the rigid chain parts 110B and 110B with the pair of chain locus regulating faces S1 and S1. Accordingly, the interlocking chain type forward and backward actuating device 100 further achieves reduction in abrasion of the coupling pin 113 by avoiding abrasion between the coupling pins 113B included in the rigid chain parts 110B and 110B and the chain guides 131. This further achieves avoidance of dual regulations for guiding both the coupling pin 113B and the outer plate face 112S simultaneously and reduction in abrasion of the coupling pin 113 based on smooth chain locus regulation. Furthermore, a collision of the edge 132A of the inlet 132 of the chain guide 131 with the coupling pin 113B is avoided, reliably achieving avoidance of damage of the coupling pin 113. Installation of an additional component such as a cover for preventing lubricating oil from scattering is eliminated. Therefore increases in the number of components and the size of the device are further avoided. The amount of scatter of the lubricating oil to the outside of the device is effectively reduced.

As shown in FIG. 7, coupling pin passages 131B form a groove shape open to rigid chain parts 110B and 110B in the chain width direction W without extending through the chain guide plate 130. Accordingly, the coupling pin passages 131B cover the coupling pins 113B included in the rigid chain parts 110B and 110B from the chain width direction W. The interlocking chain type forward and backward actuating device 100 further reduces the amount of scatter of the lubricating oil to the outside of the device.

As shown in FIGS. 1, 3, and 5 to 7, the pair of chain guide plates 130 and 130 is arranged at both sides of the pair of interlocking chains 110 and 110 in the chain width direction W. A spacer 150 is located between the pair of chain guide plates 130 and 130. The spacer 150 defines a distance D between the pair of chain guide plates 130 and 130. Adjusting the distance D between the chain guide plates 130 and 130 adjusts a chain regulating force. The chain regulating force is applied from the pair of respective chain locus regulating faces S1 and S1 to the rigid chain parts 110B and 110B in the chain width direction W. The interlocking chain type forward and backward actuating device 100 appropriately adjusts the chain regulating force according to size change of the interlocking chains 110 and 110 in the chain width direction W, thus achieving further reliably reduced abrasion of the coupling pins 113.

Further, as shown in FIGS. 5 and 6, the disengagement part guide 131A is a groove-shaped guide open to the chain disengagement parts 110A. The disengagement part guide 131A, which constitutes the groove-shaped guides, includes a grooved bottom faces 131S facing the distal ends of the coupling pins 113A included in the chain disengagement parts 110A. Accordingly, the coupling pins 113A, which are included in the chain disengagement parts 110A, are covered by the disengagement part guides 131A in the chain width direction W. The interlocking chain type forward and backward actuating device 100 reliably reduces the amount of scatter of the lubricating oil from the interlocking chains 110 to the outside of the device after the interlocking chains 110 and 110 are disengaged from each other.

With the interlocking chain type forward and backward actuating device 100 thus obtained according to the first embodiment, the pair of chain locus regulating members 140 and 140 brings the respective chain locus regulating faces S1 and S1 into contact with outer plate faces 112S and 112S from both sides of the rigid chain parts 110B and 110B in the chain width direction W. The outer plate faces 112S and 112S are included in the pair of respective outer tooth plates 112 arranged at the outermost positions among the plurality of outer tooth plates 112 included in the rigid chain parts 110B and 110B in the chain width direction W. The coupling pin passages 131B and 131B where the coupling pins 113B included in the rigid chain parts 110B and 110B extend through in the rigid chain direction B are formed at the chain guide plates 130 with the coupling pin passages 131B and 131B communicating with the disengagement part guides 131A. Since the passage width WB of the coupling pin passage 131B is larger than the guide width WA of the disengagement part guide 131A, reduction in abrasion of the coupling pin 113 is further achieved by avoiding abrasion between the coupling pins 113B included in the rigid chain parts 110B and 110B and the chain guides 131. This also reliably achieves avoidance of dual regulations that guide both the coupling pin 113B and the outer plate face 112S simultaneously and reduction in abrasion of the coupling pin 113 based on smooth chain locus regulation. Furthermore, collisions of the coupling pin 113B with the inlet 132 of the chain guide 131 in the chain width direction W and with the edge 132A in the disengagement direction A are avoided, thus reliably achieving avoidance of damage to the coupling pin 113. Installation of an additional component such as a cover for preventing lubricating oil from scattering is eliminated, and therefore increases in the number of components and the size of the device are further avoided. The amount of scatter of the lubricating oil to the outside of the device is effectively reduced. Thus, the advantages are extensive.

Second Embodiment

Next, an interlocking chain type forward and backward actuating device 200 according to a second embodiment of the present invention will be described with reference to FIGS. 8 to 10.

The interlocking chain type forward and backward actuating device 200 according to this embodiment differs only in shapes of a disengagement part guide 231A and a coupling pin passage 231B from the corresponding parts of the interlocking chain type forward and backward actuating device 100 according to the above-described first embodiment. Other configurations are the same as those of the interlocking chain type forward and backward actuating device 100 according to the above-described first embodiment. Reference numerals between one hundred and two hundred of parts common to those in the interlocking chain type forward and backward actuating device 100 according to the first embodiment are replaced by numbers in the two hundreds, and the parts will not be further elaborated here.

With the interlocking chain type forward and backward actuating device 200 according to the embodiment, the disengagement part guide 231A and the coupling pin passage 231B are formed to be shaped so as to extend through a chain guide plate 230. Accordingly, the chain guide plate 230 may be thinned compared with the case where the disengagement part guide 231A and the coupling pin passage 231B are formed into a groove shape, ensuring light weight of the entire device.

Forming at least one of the disengagement part guide 231A and the coupling pin passage 231B into a shape so as to extend through the chain guide plate 230 allows the interlocking chain type forward and backward actuating device 200 to be light weight in the entire device compared with the case where both the disengagement part guide 231A and the coupling pin passage 231B are formed into a groove shape.

Third Embodiment

Next, an interlocking chain type forward and backward actuating device 300 according to a third embodiment of the present invention will be described with reference to FIGS. 11 to 15.

The interlocking chain type forward and backward actuating device 300 according to the third embodiment includes a pair of interlocking chains 310 and 310 and a driven body 320 as a basic device configuration. Each interlocking chain 310 includes hook-shaped inner tooth plate 311, hook-shaped outer tooth plates 312, and coupling pins 313. The hook-shaped outer tooth plates 312 are shifted in the chain longitudinal direction relative to the inner tooth plates 311. The coupling pins 313 extend through the inner tooth plates 311 and the outer tooth plates 312 in the chain width direction W. A large number of the inner tooth plates 311 and the outer tooth plates 312 are coupled to one another in the chain longitudinal direction with the coupling pin 313. The pair of interlocking chains 310 and 310 is driven by a drive sprocket SP3. The interlocking chains 310 and 310 are interlocked with each other at the inner tooth plates 311 and the outer tooth plates 312 to become rigid. Also, the pair of interlocking chains 310 and 310 disengages from each other at the inner tooth plates 311, which are respectively engaged, and the outer tooth plates 312, which are respectively engaged, in the chain disengagement direction A to bifurcate from one another. The driven body 320 is mounted to the pair of interlocking chains 310 and 310 and is moved forward and backward according to the forward and backward operations of the pair of interlocking chains 310 and 310. The interlocking chain type forward and backward actuating device 300 is installed on the installation face G. The driven body 320, such as a table, on which a conveyed matter such as a heavy load (not shown) is mounted, moves up and down parallel to the installation face G.

More specifically, the interlocking chain type forward and backward actuating device 300 according to the third embodiment includes bushings 314. The coupling pins 313 are inserted into the bushings 314. The bushings 314 engage the sprocket teeth of the drive sprocket SP3 to drive the pair of interlocking chains 310 and 310 and moves forward and backward the driven body 320 in the vertical direction in the drawing.

Next, a specific configuration most characteristic to the interlocking chain type forward and backward actuating device 300 according to the third embodiment will be described in detail with reference to FIGS. 11 to 15.

With the interlocking chain type forward and backward actuating device 300 according to the present embodiment, reference numerals between one hundred and two hundred of parts common to those in the interlocking chain type forward and backward actuating device 100 according to the first embodiment are replaced by numbers in the three hundreds, and the parts will not be further elaborated.

The interlocking chain type forward and backward actuating device 300 according to the third embodiment, as shown in FIGS. 11 to 14, includes respective chain guide plates 330 at both sides of the pair of interlocking chains 310 and 310 in the chain width direction W. The chain guide plate 330 includes a chain guide 331 with disengagement part guides 331A and 331A, which guide chain disengagement parts 310A and 310A. The chain guide 331 houses the distal end of a coupling pin 313A included in the chain disengagement parts 310A and 310A where the interlocking chains 310 and 310 are disengaged in the chain width direction W. A chain locus regulating member 340A as a chain locus regulating means is located adjacent to rigid chain parts 310B and 310B. The chain locus regulating member 340A includes a chain locus regulating face S3 and guides the rigid chain parts 310B and 310B. The chain locus regulating face S3 contacts the rigid chain parts 310B and 310B where the interlocking chains 310 and 310 are interlocked with each other to become rigid.

Thus, the interlocking chain type forward and backward actuating device 300 according to the third embodiment avoids abrasion between coupling pins 313B included in the rigid chain parts 310B and 310B and the inner wall face of the chain guide 331 while at least the rigid chain parts 310B and 310B are guided with the chain locus regulating face S3. Also, collision between the coupling pins 313B and an edge 332A of an inlet 332 of the chain guide 331 is avoided when the rigid chain parts 310B and 310B, which are extended from the inlet 332 of the chain guide 331 to the outside of the device, are housed in the inlet 332 of the chain guide 331 again. Further, while the rigid chain parts 310B and 310B are guided, the periphery of the rigid chain part 310B is at least partially covered by the chain locus regulating face S3. Accordingly, the interlocking chain type forward and backward actuating device 300 avoids an increase in work for forming a chain guide where a complicated guide shape of the chain guide is formed, while achieving reduction in abrasion and damages to the coupling pins 313. Moreover, chain collision noise and vibration are reduced, installation of an additional component such as a cover for preventing lubricating oil from scattering is eliminated, increases in the number of components and the size of the device are avoided, and the amount of scatter of the lubricating oil that scatters outside of the device is reduced.

Describing in detail, with the interlocking chain type forward and backward actuating device 300 according to the third embodiment, the chain locus regulating member 340A, which is a chain locus regulating means, brings the chain locus regulating face S3 into contact with the respective plate side faces of inner tooth plates 311B and outer tooth plates 312B, which are included in the rigid chain parts 310B and 310B, from one side in the chain disengagement direction A. The drive sprocket SP3 is arranged at the side opposite to a chain locus regulating member 340 viewed from the rigid chain parts 310B and 310B and engages with one of the pair of interlocking chains 310 and 310. This avoids galling between the coupling pins 313B included in the rigid chain parts 310B and 310B, namely, the peripheral faces of the coupling pins 313B and the chain guides 331, namely, the inner wall faces of the guide for rigid chain part 331B, which guides the rigid chain part 310B in a rigid chain direction B. Also, when the chain drives, wobbling of the rigid chain parts 310B and 310B in the chain disengagement direction A is avoided. Moreover, the chain disengagement parts 310A and 310A and the rigid chain parts 310B and 310B are separately guided with the disengagement part guide 331A and the chain locus regulating face S3, respectively while the rigid chain part 310B is covered by the chain locus regulating face S3. This further achieves reduction in abrasion of the coupling pins 313 and also avoids dual regulations for guiding both the coupling pins 313 and the outer tooth plates 312 simultaneously and reduction in abrasion of the coupling pins 313 based on smooth chain locus regulation. Furthermore, a collision of the edge 332A of the inlet 332 of the chain guide 331 with the coupling pins 313B is avoided, reliably achieving avoidance of damage of the coupling pin 313. Installation of an additional component such as a cover for preventing lubricating oil from scattering is eliminated, and therefore increases in the number of components and the size of the device are further avoided. The amount of scatter of the lubricating oil to the outside of the device is effectively reduced, and this further increases strength of the guide.

At the side where the drive sprocket SP3 is located, the chain guide near the inlet 332 of the chain guide 331 is performed by a chain locus regulating member 340B.

Additionally, as shown in FIGS. 11 to 14, the interlocking chain type forward and backward actuating device 300 according to this embodiment includes a chain width direction regulating face S4. The chain width direction regulating face S4 faces the rigid chain parts 310B and 310B in the chain width direction W and contacts the distal ends of the coupling pins 313B included in the rigid chain parts 310B and 310B. Since the chain width direction regulating face S4 is a part of a chain guide plate face 333 of the chain guide plate 330, when the chain drives, wobbling of the rigid chain parts 310B and 310B is avoided both in the chain disengagement direction A and the chain width direction W, and the coupling pins 313B are covered in the chain width direction W. Therefore, when the rigid chain parts 310B and 310B extending from the inlet 332 of the chain guide 331 to the outside of the device are housed from the inlet 332 of the chain guide 331 again, the edge 332A of the inlet 332 of the chain guide 331 does not collide with the coupling pins 313B, further reliably avoiding damage of the coupling pins 313 and further reducing the amount of scatter of the lubricating oil to the outside of the device.

The interlocking chain type forward and backward actuating device 300 according to the third embodiment is similar to the interlocking chain type forward and backward actuating device 100 according to the above-described first embodiment as follows. As shown in FIG. 15, a disengagement part guide 331A is a groove-shaped guide open to the chain disengagement part 310A. The disengagement part guide 331A, which constitutes this groove-shaped guide, includes a grooved bottom face 331S facing the distal end of the coupling pin 313A included in the chain disengagement part 310A. Accordingly, the coupling pin 313A, which is included in the chain disengagement part 310A, is covered by the disengagement part guide 331A from the chain width direction W. Thus, the amount of scatter of the lubricating oil from the interlocking chain 310 outside of the device is reliably reduced after the interlocking chains 310 and 310 are disengaged from each other.

With the interlocking chain type forward and backward actuating device 300 according to the embodiment, similarly to the interlocking chain type forward and backward actuating device 200 according to the second embodiment, the disengagement part guide 331A without the grooved bottom face 331S may be formed and the coupling pin 313A may extend through the chain guide plate 330 so as to reduce weight of the entire device.

With the interlocking chain type forward and backward actuating device 300 thus obtained according to the third embodiment, the chain locus regulating member 340A, which is a chain locus regulating means, brings the chain locus regulating face S3 into contact with the respective plate side faces of the inner tooth plates 311B and the outer tooth plates 312B, which are included in the rigid chain parts 310B and 310B, from one side in the chain disengagement direction A. The drive sprocket SP3 is located at the side opposite to the chain locus regulating member 340 viewed from the rigid chain parts 310B and 310B and engages with one of the interlocking chains 310 and 310. This further reliably reduces abrasion of the coupling pins 313 and also avoids dual regulations for guiding the coupling pins 313 and the outer tooth plates 312 simultaneously. Abrasion of the coupling pins 313 is reduced based on smooth chain locus regulation. Furthermore, a collision of the edge 332A of the inlet 332 of the chain guide 331 with the coupling pin 313B is avoided, reliably achieving avoidance of damage of the coupling pin 313. Installation of an additional component such as a cover for preventing lubricating oil from scattering is eliminated, and therefore increases in the number of components and the size of the device are further avoided. The amount of scatter of the lubricating oil outside of the device is effectively reduced. Thus, the advantages are extensive.

The interlocking chain type forward and backward actuating devices 100, 200, and 300 according to the above-described first embodiment to the third embodiment can be used as a drive unit and secured to a wall face or similar member.

DESCRIPTION OF THE REFERENCE NUMERALS 100, 200, 300 interlocking chain type forward and backward actuating device
110, 310 interlocking chain
110A, 210A, 310A chain disengagement part
110B, 210B, 310B rigid chain part
111, 211, 311, 311A, 311B inner tooth plate
112, 212, 312, 312A, 312B outer tooth plate
112S outer plate face
113, 113A, 113B, 213A, 213B, 313, 313A, 313B coupling pin
120, 320 driven body
130, 230, 330 chain guide plate
131, 231, 331 chain guide
131A, 231A, 331A disengagement part guide
131B, 231B coupling pin passage
131S, 331S grooved bottom face
132, 332 inlet of chain guide
132A, 332A edge of inlet of chain guide
140, 240, 340A, 340B chain locus regulating member
150 spacer
314 bushing
331B guide for rigid chain part
333 chain guide plate face
A chain disengagement direction
B rigid chain direction
D distance between chain guide plates
G installation face
S1, S2, S3 chain locus regulating face
S4 chain width direction regulating face
SP1, SP3 drive sprocket
W chain width direction
WA guide width of disengagement part guide
WB passage width of coupling pin passage

The invention claimed is:

1. An interlocking chain type forward and backward actuating device comprising a pair of interlocking chains, a driven body, and a chain guide plate, wherein
the interlocking chains include hook-shaped inner tooth plates and hook-shaped outer tooth plates,
the hook-shaped outer tooth plates arranged alternately with the inner tooth plates in a chain longitudinal direction,
the inner tooth plates and the outer tooth plates coupled to one another in the chain longitudinal direction with coupling pins,
the coupling pins extending through the inner tooth plates and the outer tooth plates in a chain width direction,
at least one of the pair of interlocking chains being driven by a drive sprocket such that the interlocking chains become rigid with inner tooth plates of one interlocking chain are interlocked with inner tooth plates of the other interlocking chain, and outer tooth plates of the one interlocking chain are interlocked with outer tooth plates of the other interlocking chain, and such that the interlocking chains bifurcate from each other with the interlocked inner tooth plates being disengaged and the interlocked outer tooth plates being disengaged;
the driven body is mounted to the pair of interlocking chains,
the driven body is moved forward and backward according to forward and backward movement of the pair of interlocking chains,
the interlocking chain type forward and backward actuating device comprising a chain guide plate and a chain locus regulating means;
the chain guide plate comprising a first disengagement part guide and a second disengagement part guide, wherein the first disengagement part guide and the second disengagement part guide are operable to guide projecting portions of the coupling pins at a chain disengagement part where the interlocking chains are disengaged from each other,
the chain guide plate provided on both sides of the pair of interlocking chains,
the chain locus regulating means guides a rigid chain part,
the chain locus regulating means comprises a chain locus regulating face,
the chain locus regulating face operable to contact the rigid chain part where the interlocking chains are interlocked with each other to become rigid,
the chain locus regulating means comprising a pair of chain locus regulating members;
the chain locus regulating members bring the respective chain locus regulating faces into contact with outer plate faces from both sides of the rigid chain part in the chain width direction, the outer plate faces being included in a pair of respective outer tooth plates arranged outermost among the plurality of outer tooth plates included in the rigid chain part in the chain width direction,
wherein the chain locus regulating members are operable to guide the interlocking chains when the chains are interlocked and rigid, and the disengagement part guides are operable to guide the interlocking chains with the chain locus regulating face at a chain disengagement position and/or when the chains are not interlocked;
wherein the rigid chain part includes a first coupling pin and a second coupling pin, the first coupling pin extending through a first coupling pin passage in a rigid chain direction, and the second coupling pin extending through a second coupling pin passage in the rigid chain direction,
wherein the coupling pin passages are formed at the chain guide plate with the first coupling pin passage communicating with the first guide for the chain disengagement part, and the second coupling, pin passage communicating with the second guide for the chain disengagement part, and
the coupling pin passages have a passage width larger than a guide width of the disengagement part guides.

2. The interlocking chain type forward and backward actuating device according to claim 1, wherein the coupling pin passages form groove shapes open to the rigid chain part in the chain width direction without extending through the chain guide plate.

3. The interlocking chain type forward and backward actuating device according to claim 1, further comprising a spacer located between a pair of chain guide plates, wherein
the spacer defines a distance between the pair of chain guide plates, and
the guide plates are located at both sides of the pair of interlocking chains in the chain width direction.

4. The interlocking chain type forward and backward actuating device according to claim 1, wherein the chain locus regulating means includes a chain locus regulating member, the chain locus regulating member brings the chain locus regulating face into contact with plate side faces of the inner tooth plate and the outer tooth plate included in the rigid chain parts from one side in the chain disengagement direction, and the drive sprocket is located on the opposite side from the chain locus regulating member as viewed from the rigid chain parts and engages with one of the interlocking chains.

5. The interlocking chain type forward and backward actuating device according to claim 4, wherein a chain width direction regulating face faces the rigid chain part from the chain width direction, the chain width direction regulating face contacts a distal end of a coupling pin included in the rigid chain part, and the chain width direction regulating face forms a part of a chain guide plate face of the chain guide plate.

6. The interlocking chain type forward and backward actuating device according to claim 1, wherein the disengagement part guides are groove-shaped guides open to the chain disengagement part, the disengagement part guides form the groove-shaped guides, the disengagement part guides include grooved bottom faces, the grooved bottom faces face a distal end of the coupling pins included in the chain disengagement part.

* * * * *